(No Model.)
R. S. PEASE.
MANUFACTURE OF GLASS CYLINDERS, PIPES, &c.
No. 463,645. Patented Nov. 24, 1891.
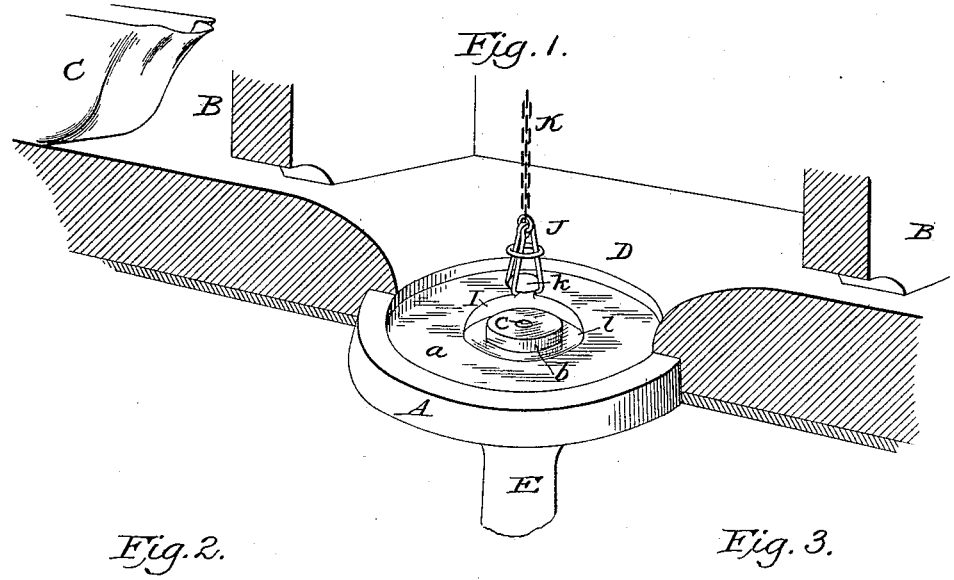
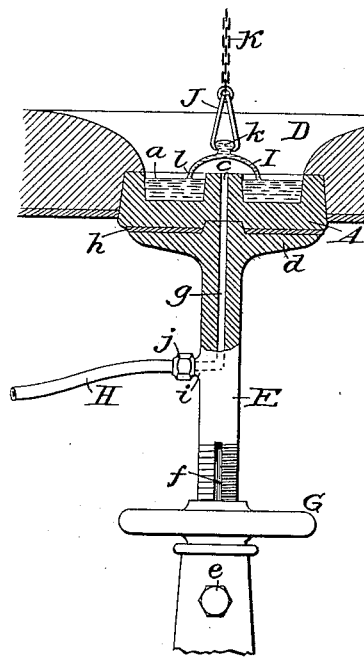
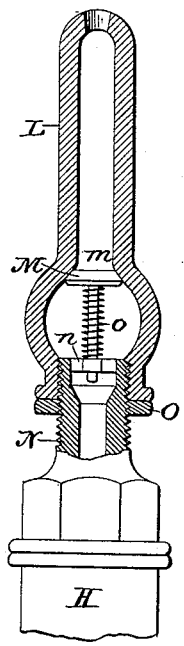
Witnesses:
James F. Duhamel
Horace A. Dodge
Inventor:
ROGER S. PEASE,
by Dodge Sons,
Attys.

UNITED STATES PATENT OFFICE.

ROGER S. PEASE, OF ROSE, ASSIGNOR OF ONE-HALF TO COURTLANDT BABCOCK AND AMBROSE B. EVERTS, OF MINNEAPOLIS, MINNESOTA.

MANUFACTURE OF GLASS CYLINDERS, PIPES, &c.

SPECIFICATION forming part of Letters Patent No. 463,645, dated November 24, 1891.

Application filed February 24, 1891. Serial No. 382,566. (No model.)

*To all whom it may concern:*

Be it known that I, ROGER S. PEASE, a citizen of the United States, residing at Rose, in the county of Ramsey and State of Minnesota, having my place of business and post-office address at Minneapolis, Minnesota, have invented certain new and useful Improvements in the Manufacture of Glass Cylinders, Pipes, &c., of which the following is a specification.

This invention relates to the formation of cylinders, pipes, and other tubular or hollow bodies of glass; and it consists, essentially, in lowering into a mass of molten metal the depending skirt or flange of a bait, raising said bait to form a film or sheet, and while raising the same forcing air into the interior of the body thus produced, thereby expanding the same to the desired diameter, the air-pressure being continued during the upward movement or drawing operation to prevent the drawing in of the body, but the pressure being made only sufficient to maintain such diameter without further variation. It is not essential that the enlarging operation be performed, though it is deemed quite desirable that it should be, as I am thereby enabled to make use of a much smaller bait and to start the drawing operation under more favorable conditions than would otherwise exist. If it be desired to reduce the diameter, the air-pressure is so far reduced as to permit the drawing of the metal toward the center to the required extent.

The invention also consists in other features and details hereinafter explained.

In the accompanying drawings I have represented an apparatus suitable for carrying out the above-described process; but I do not mean to restrict myself to the specific construction therein shown, as it may be variously modified without departing from the spirit and scope of my invention.

Figure 1 is a perspective view showing so much of the apparatus as is needed to make clear the description which follows; Fig. 2, a sectional elevation showing the arrangement of parts in a similar form; Fig. 3, a sectional view of the mouth-piece of the blowing-tube, showing an outwardly-closing check-valve, which is designed to prevent back-pressure or escape of air from within the body which is being drawn or produced.

The apparatus consists, essentially, of a containing-vessel A, advisably formed with an annular chamber $a$ to receive and contain molten metal, the raised central boss $b$ being carried upward to or preferably above the level of the outer wall of the vessel, as indicated in Fig. 2, and having a central passage or opening $c$ to permit the delivery of air to the hollow body being formed.

In practice I find it advisable to arrange the vessel A for use in connection with the supply pots or tanks, so arranged as to deliver directly into said vessel, and with this object in view provide one or more chambers B, within which are arranged melting-pots C or tanks, as may be preferred, the pots being represented in the drawings and deemed preferable for general purposes. The bottom wall or floor of the chambers B is extended from one chamber to the other, as indicated, or it may be simply an extension of the floor of one of said chambers, and is furnished with an opening D, which is so fashioned and proportioned as to permit the insertion of the vessel A into it from below and to cause the inner wall of the chamber $a$ of said vessel to come flush with the overhanging walls of the opening D.

For convenience of handling and manipulation I mount the vessel A upon the enlarged top or platform $d$ of a vertically-movable column E, which is represented in Fig. 2 as externally threaded and grooved to receive a guiding pin or bolt $e$, which projects into the groove $f$ after passing through a supporting-base F, and encircling and meshing with the threaded portion of the standard or column E is a nut or hand-wheel G, which, being turned in one or the other direction, causes the rise or fall of the standard E, and consequently of the vessel A.

As shown in Fig. 2, the standard E is provided with a central opening $g$, which registers with and forms a continuation of the central opening or passage $c$ of the vessel A when said vessel is placed in position upon the standard E. To insure a proper register of the openings $c$ and $g$, the vessel A is formed with a central recess in its under side, and the platform *d* is formed with a corresponding boss, which enters and accurately fills said recess and serves the further purpose of centering the vessel upon the platform and holding it against accidental displacement. To further insure a tight joint and prevent the escape of air between the platform *d* and the vessel A, a sheet *h* of asbestus packing may be introduced between them, as indicated in Fig. 2. The passage or opening *g* extends downward in the standard E to a suitable point, and then turns laterally and extends outward through a nipple *i*, which is threaded to receive a coupling or union *j*, by which the blow-pipe or air-supply tube H is connected with the apparatus.

I indicates a bait, which is advisably made of glass, though I do not restrict myself necessarily to the use of glass, but may use iron or other substance. This bait is formed with a central knob or projection *k* on its top and with a depending flange or skirt *l* at its periphery, as indicated in Figs. 1 and 2. This knob is designed for the attachment of a clamp or crab J, which is suspended by a chain or cable K passing over a pulley above the apparatus, and thence to any convenient drum or windlass by which the crab, the bait, and the cylinder may be raised, as required.

With the apparatus constructed and arranged as above described the operation is as follows: The knob I of the bait is secured within the clamp or crab J, and the latter is lowered carefully until the depending skirt or flange *l* thereof dips into the molten metal of the vessel A, and it is allowed to remain there a sufficient length of time to cause said bait to become partially fused and unite with the molten metal of said vessel. The chain or cable is then wound upon the windlass or is otherwise drawn up at a suitable rate of speed, and the film or body of glass is drawn up with it, following the depending edge or skirt of said bait. During such elevation air is forced in through the pipe H and the openings or passages *g* and *c* to the interior of the body being formed, and as a consequence the molten metal or glass film or body depending from the skirt of the bait is enlarged and the metal is taken farther and farther from the center of the vessel until the desired diameter is reached, whereupon the pressure of the air forced in is reduced sufficiently to prevent further enlargement, but is maintained at the proper point to insure the maintenance of the size thus determined. As the cylinder rises and the glass is exposed to the surrounding atmosphere it becomes set and hardened and possesses sufficient strength and rigidity to draw up after it the film or body of metal required to continue the formation or production of a cylinder of whatever length may be required. When the desired length is attained, the upward movement of the cylinder is suddenly accelerated and the film is thereby drawn very thin and either caused to break itself or rendered susceptible of easy breaking; but it may be drawn up without continuing the air-pressure, in which case it tends to draw to a point and may then be readily cut with shears in the common way of cutting hot glass. The cylinder is then carried away, the ends cut off, the cylinder opened longitudinally and flattened out, and the plate is then annealed in the ordinary way and cut up into sheets of the required size or may be left in one sheet, if preferred. In practice it is preferred that the glass shall be blown or the air-pressure furnished by a glass-blower in the same manner that common cylinders are blown—that is to say, instead of employing mechanical contrivances for furnishing air under pressure it is to be blown by the attendant supplying air from his lungs through the pipe H. In the event of the breaking of the knob *k*, the slipping of the clamp J, or the falling of the cylinder from any other cause, the contained air, which would of course be highly heated, would be forced back through the passages *c g* and the pipe H into the mouth and lungs of the glass-blower and would result in serious injury to him. To obviate this danger I provide at any point between the tip of the mouth-piece L of the blow-pipe and the upper end of the passage or opening *c* a check-valve M, which closes outwardly or against the inflowing air. In practice I prefer to locate this valve in the mouth-piece of the blow-pipe and to construct the same as shown in Fig. 3. As therein represented, the mouth-piece is internally threaded to permit it to screw upon the threaded neck of an end piece or tip N, which is applied to the pipe H, and the mouth-piece L is provided with a seat *m* for the valve M, which is provided with a guiding-stem carried by a cross-bar *n*, extending across the mouth of the tip or end piece N. Between the cross-bar *n* and the back of the valve M is introduced a light spiral spring *o*, which serves to press the valve upward and to hold it normally against its seat *m*, but with so light a pressure as to offer practically no resistance to the entrance of air through the mouth-piece. In order that the force with which the spring acts may be adjusted, if at any time it is necessary to do so, the mouth-piece and the end piece or tip N are formed with comparatively long threaded portions, so that the mouth-piece L may be screwed on a greater or less distance and caused to bring the valve-seat *m* nearer to or farther from the cross-bar N. When adjusted to the proper position, the mouth-piece L is clamped and held against accidental turning by a jam-nut O or in any other convenient way. This check-valve may be used in connection with blow-pipes generally to avoid the necessity of placing the thumb or finger over the opening while not blowing, as is now customary, and when provided it will effectually prevent the inhaling of the hot-fuel air from within the cylinder, which is believed to be a prolific cause of injury to the glass-blower. It is, however, peculiarly useful and important in connection with the method and apparatus above set forth, because of the liability of the collapsing of the cylinder, as explained. The pipe H should be flexible, in order to permit the glass-blower to change his position as desired, and also to permit the free rise and fall of the column E without interference with said pipe.

It is obvious that a check-valve may be employed which shall operate simply by the back-pressure of the air without the aid of a spring, though I prefer the spring-actuated valve, because of its greater certainty and promptness of action.

I am aware that a check-valve has heretofore been employed in a blow-pipe to prevent back-pressure or escape of air from within a body being blown, and therefore I make no broad claim thereto.

Having thus described my invention, what I claim is—

1. The herein-described method of producing hollow bodies of glass, which consists in dipping into a body of molten metal the depending edge or skirt of a bait, permitting the same to unite with the molten metal, lifting said bait, and during the act of lifting supplying air to the interior of the cylinder or body, substantially as set forth.

2. The herein-described method of making glass cylinders and hollow bodies, which consists in dipping into a mass of molten metal the depending skirt or edge of a bait, permitting said bait to unite with the molten metal, lifting said bait, supplying air to the under side of the bait under pressure sufficient to cause the adhering glass to be expanded, continuing said operation until the desired diameter is attained, and then lifting the cylinder steadily subject to an internal pressure sufficient only to maintain the diameter thus produced.

3. In combination with a vessel adapted to contain molten metal and provided with a central opening or passage, a bait adapted to cover said central opening and to dip into the metal on all sides thereof, means, substantially such as described, for elevating said bait, and a blow-pipe communicating with the central opening of the vessel, substantially as and for the purpose set forth.

4. In combination with a melting chamber or oven B, having an opening D in its floor, a vessel A, adapted to contain molten metal and to fit the opening D, a vertically-movable standard or column E, adapted to sustain said vessel, and a blow-pipe H, communicating with a central opening in the vessel A, substantially as and for the purpose set forth.

5. In combination with a heating or melting chamber B, having its floor provided with an opening D, a vessel A, provided with central opening c, a standard or column E, serving to support said vessel, a base F, serving to receive and guide the standard E, and means, substantially such as shown and described, for raising and lowering said standard.

6. The herein-described apparatus for the manufacture of glass cylinders, &c., which consists of a bed or floor provided with an opening D, a vessel A, provided with a central opening c, a supporting-standard E beneath said vessel, a base F to guide and support said standard, a nut or hand-wheel G, encircling the standard E and adapted to receive a screw-thread formed thereon, a blow-pipe H, communicating with the passage c of the vessel A, a bait I, and means, substantially such as shown and described, for lowering and raising said bait to and from the vessel A.

7. In combination with vessel A, adapted to contain molten metal and having a passage or opening c, a blow-pipe communicating with said passage and provided with an outwardly-seating check-valve, a bait I above the vessel A, and means for elevating said bait.

8. In combination with the blow-pipe of a glass-blowing apparatus, an outwardly-seating check-valve, a spring serving to seat said valve, an end piece or tip, and a mouth-piece respectively provided with external and internal threads, whereby the parts may be adjusted to vary the force with which the valve is pressed to its seat.

In witness whereof I hereunto set my hand in the presence of two witnesses.

ROGER S. PEASE.

Witnesses:
WALTER S. DODGE,
WILLIAM W. DODGE.